(12) United States Patent
Vogrig

(10) Patent No.: US 12,162,669 B2
(45) Date of Patent: Dec. 10, 2024

(54) COLLATING SYSTEM FOR CONVEYOR BELT RIVETS AND METHOD

(71) Applicant: Flexible Steel Lacing Company, Downers Grove, IL (US)

(72) Inventor: Joseph Vogrig, Naperville, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 369 days.

(21) Appl. No.: 17/537,008

(22) Filed: Nov. 29, 2021

(65) Prior Publication Data

US 2022/0081194 A1 Mar. 17, 2022

Related U.S. Application Data

(62) Division of application No. 16/154,320, filed on Oct. 8, 2018, now Pat. No. 11,186,425, which is a division
(Continued)

(51) Int. Cl.
*F16G 3/08* (2006.01)
*B21J 5/06* (2006.01)
(Continued)

(52) U.S. Cl.
CPC ............... *B65D 85/24* (2013.01); *B21J 5/06* (2013.01); *B21J 15/323* (2013.01); *B25C 1/00* (2013.01); *F16G 3/08* (2013.01)

(58) Field of Classification Search
CPC .. B21J 5/06; B21J 15/323; B25C 1/00; B65D 85/24; F16G 3/08
See application file for complete search history.

(56) References Cited

U.S. PATENT DOCUMENTS

| 1,263,218 A | 4/1917 | Fischer |
| 1,485,950 A | 3/1924 | Robert |

(Continued)

FOREIGN PATENT DOCUMENTS

| CN | 1543383 | 11/2004 |
| DE | 3332927 C1 | 4/1985 |

(Continued)

OTHER PUBLICATIONS

Cross sectional view of a two part collated rivet strip with annotations identifying parts of the collated rivet strip, the collated rivet strip publicly available before Dec. 2, 2013, 1 page.
(Continued)

*Primary Examiner* — Bayan Salone
(74) *Attorney, Agent, or Firm* — Fitch, Even, Tabin & Flannery LLP

(57) ABSTRACT

A collating system for rivets is provided that includes a rivet holder for supporting rivets in a predetermined pattern. In one form, the rivet holder includes a body having cavities for supporting the rivets therein. The rivet holder body includes a top plate member and a bottom plate member. The rivet holder has drive heads connected to the top plate member via frangible portions and the bottom plate member has retaining webs disposed below the drive heads. The top and bottom plates are secured together to capture heads of the rivets between the drive heads and retaining webs. The drive heads may be driven downward to drive the rivet heads from the rivet holder and into bores of a guide block with the retaining webs flexing to release the rivet head from the lower bottom plate member. A method of using the rivet collating system is also disclosed.

7 Claims, 13 Drawing Sheets

Related U.S. Application Data of application No. 14/955,426, filed on Dec. 1, 2015, now Pat. No. 10,093,476.

(60) Provisional application No. 62/086,656, filed on Dec. 2, 2014.

(51) Int. Cl.
*B21J 15/32* (2006.01)
*B25C 1/00* (2006.01)
*B65D 85/24* (2006.01)

(56) References Cited

U.S. PATENT DOCUMENTS

| | | |
|---|---|---|
| 1,747,390 A | 3/1927 | Robb |
| 3,141,346 A | 7/1964 | Dean |
| 3,176,358 A | 4/1965 | Henry |
| 3,432,985 A | 3/1969 | Halstead |
| 3,450,255 A | 6/1969 | Mosetich |
| 3,640,789 A | 2/1972 | Hepfer |
| 3,679,266 A | 7/1972 | Jenkins |
| 3,774,755 A | 11/1973 | Cast et al. |
| 3,779,373 A | 12/1973 | Maier |
| 3,812,961 A | 5/1974 | Merrick |
| 3,885,669 A | 5/1975 | Potucek |
| 3,892,313 A | 7/1975 | Lange |
| 3,904,032 A | 9/1975 | Maier |
| 3,913,180 A | 10/1975 | Pray |
| 3,944,068 A | 3/1976 | Maier et al. |
| 3,955,674 A | 3/1976 | Maier et al. |
| 3,971,421 A | 7/1976 | Damratowski |
| 3,990,343 A | 11/1976 | Francois |
| 4,007,834 A | 2/1977 | Borgersen |
| 4,018,334 A | 4/1977 | Lejdegard |
| 4,033,456 A | 7/1977 | Wion et al. |
| 4,047,611 A | 9/1977 | Damratowski |
| 4,212,094 A | 7/1980 | Pray |
| 4,218,953 A | 8/1980 | Haytayan |
| 4,258,461 A | 3/1981 | Pray |
| 4,333,217 A | 6/1982 | Pray |
| 4,344,213 A | 8/1982 | Pray |
| 4,349,106 A | 9/1982 | Bogel |
| 4,380,109 A | 4/1983 | Pray |
| 4,403,694 A | 9/1983 | Schmale |
| 4,684,022 A | 8/1987 | Potucek |
| 4,688,711 A | 8/1987 | Gladding et al. |
| 4,718,551 A | 1/1988 | Whitledge |
| 4,955,476 A | 9/1990 | Nakata et al. |
| 5,046,396 A | 9/1991 | Pfister |
| 5,115,911 A | 5/1992 | Schulte et al. |
| 5,244,088 A | 9/1993 | Musil |
| 5,366,082 A | 11/1994 | Haytayan |
| 5,487,217 A | 1/1996 | Richardson et al. |
| 5,622,257 A | 4/1997 | Deschenes et al. |
| 5,733,308 A | 3/1998 | Daugherty et al. |
| 5,913,421 A * | 6/1999 | Shinjo .................. B25B 23/045 206/347 |
| 5,984,096 A | 11/1999 | Shinjo |
| 6,116,835 A | 9/2000 | Blacket et al. |
| 6,823,990 B2 | 11/2004 | Gaudron |
| 7,493,682 B2 | 2/2009 | Richardson et al. |
| 7,654,389 B2 * | 2/2010 | Vogrig .................. B21J 15/323 206/820 |
| 8,082,646 B2 | 12/2011 | Richardson et al. |
| 8,403,139 B2 * | 3/2013 | Richardson ............... F16G 3/16 206/346 |
| 8,413,740 B2 | 4/2013 | Rodenhouse |
| 9,228,635 B2 | 1/2016 | Richardson et al. |
| 10,093,476 B2 * | 10/2018 | Vogrig ...................... B25C 1/00 |
| 11,186,425 B2 * | 11/2021 | Vogrig ...................... B21J 5/06 |
| 2004/0045136 A1 * | 3/2004 | Musil ....................... F16G 3/08 24/37 |
| 2005/0230278 A1 * | 10/2005 | Vogrig ...................... F16G 3/08 206/338 |
| 2009/0106972 A1 * | 4/2009 | Richardson ............. F16G 3/003 29/798 |
| 2009/0106973 A1 | 4/2009 | Richardson et al. |
| 2009/0223023 A1 | 9/2009 | Daniels et al. |
| 2011/0100848 A1 | 5/2011 | Busch |
| 2012/0227231 A1 * | 9/2012 | Richardson ............... F16G 3/04 29/243.51 |
| 2012/0228170 A1 * | 9/2012 | Richardson ............... F16G 3/04 206/338 |
| 2016/0159559 A1 * | 6/2016 | Vogrig ...................... B25C 1/00 206/347 |
| 2019/0039818 A1 * | 2/2019 | Vogrig ...................... F16G 3/08 |

FOREIGN PATENT DOCUMENTS

| | | | |
|---|---|---|---|
| EP | 0565302 A2 | 10/1993 | |
| GB | 2146730 A | 4/1985 | |

OTHER PUBLICATIONS

Notification of Transmittal of the International Search Report and the Written Opinion of the International Searching Authority, or the Declaration from the International Bureau of WIPO for International Application No. PCT/US15/63203 dated Feb. 16, 2016, 11 pages.

SIPO; Chinese App. No. 201580074667.9; First Office Action mailed Jul. 10, 2018; pp. 1-8.

\* cited by examiner

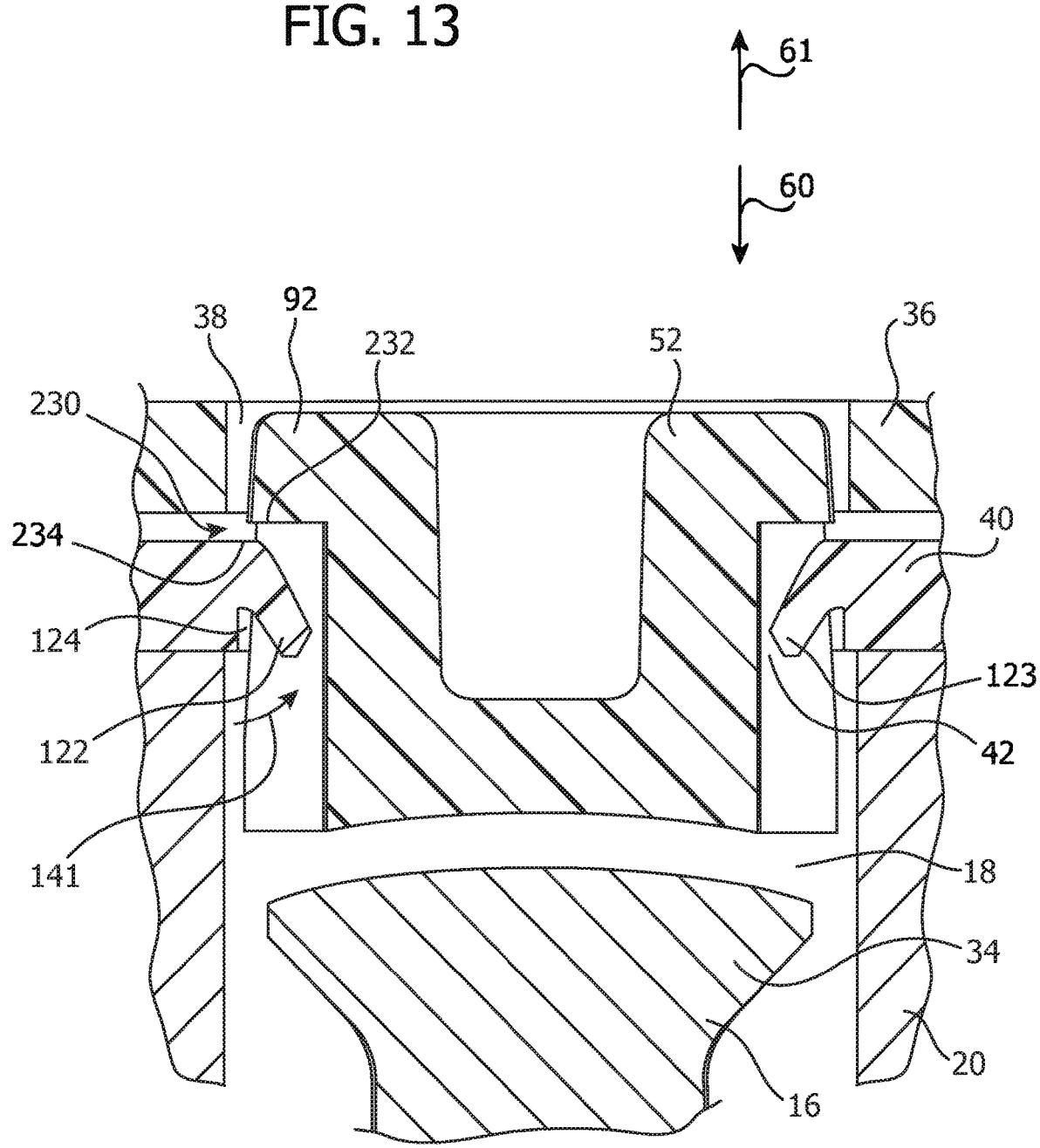

COLLATING SYSTEM FOR CONVEYOR BELT RIVETS AND METHOD

CROSS-REFERENCE TO RELATED APPLICATIONS

This application is a divisional of U.S. patent application Ser. No. 16/154,320 entitled "Collating System for Conveyor Belt Rivets and Method" filed Oct. 8, 2018, which is a divisional of U.S. patent application Ser. No. 14/955,426 entitled "Collating System for Conveyor Belt Rivets and Method" filed Dec. 1, 2015, which issued as U.S. Pat. No. 10,093,476 on Oct. 9, 2018, which claims the benefit of U.S. Provisional Patent Application No. 62/086,656 entitled "Collating System for Conveyor Belt Rivets and Method" filed Dec. 2, 2014, which are hereby incorporated by reference in their entirety.

FIELD

The invention relates to a collating system for rivets and, more particularly, to a rivet holder and method for use.

BACKGROUND

Collating systems are known for holding rivets in a pattern that matches that of the bores of a guide block and makes it easier for a user to load rivets into a guide block. For example, U.S. Pat. No. 7,654,389 to Vogrig et al. discloses a strip of several rivet holders that each hold rivets in a predetermined pattern of apertures. The rivet holders include drive heads that are driven to push the rivets out of the apertures and into the guide block bores.

BRIEF DESCRIPTION OF THE DRAWINGS

FIG. 13 is a cross-sectional view similar to FIG. 11 showing the rivet driven out from the holder and into the guide block guide bore and the bottom plate member resisting passage of the drive head into the guide bore.

DETAILED DESCRIPTION

Figure 1:
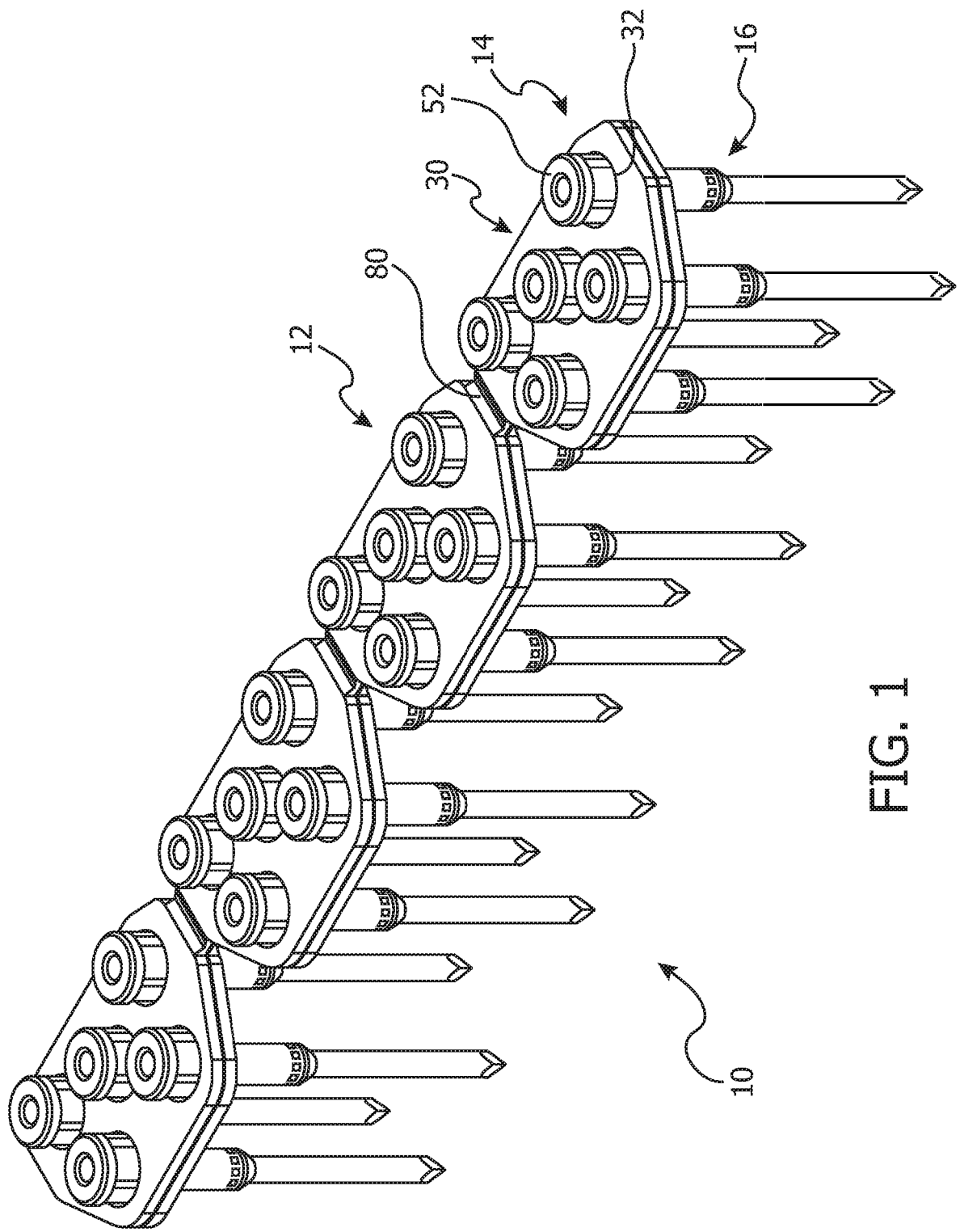
FIG. 1 is perspective view of a collating system for conveyor belt rivets showing a strip of rivet holders supporting rivets to be inserted in guide bores of a guide block.
Figure 1A:
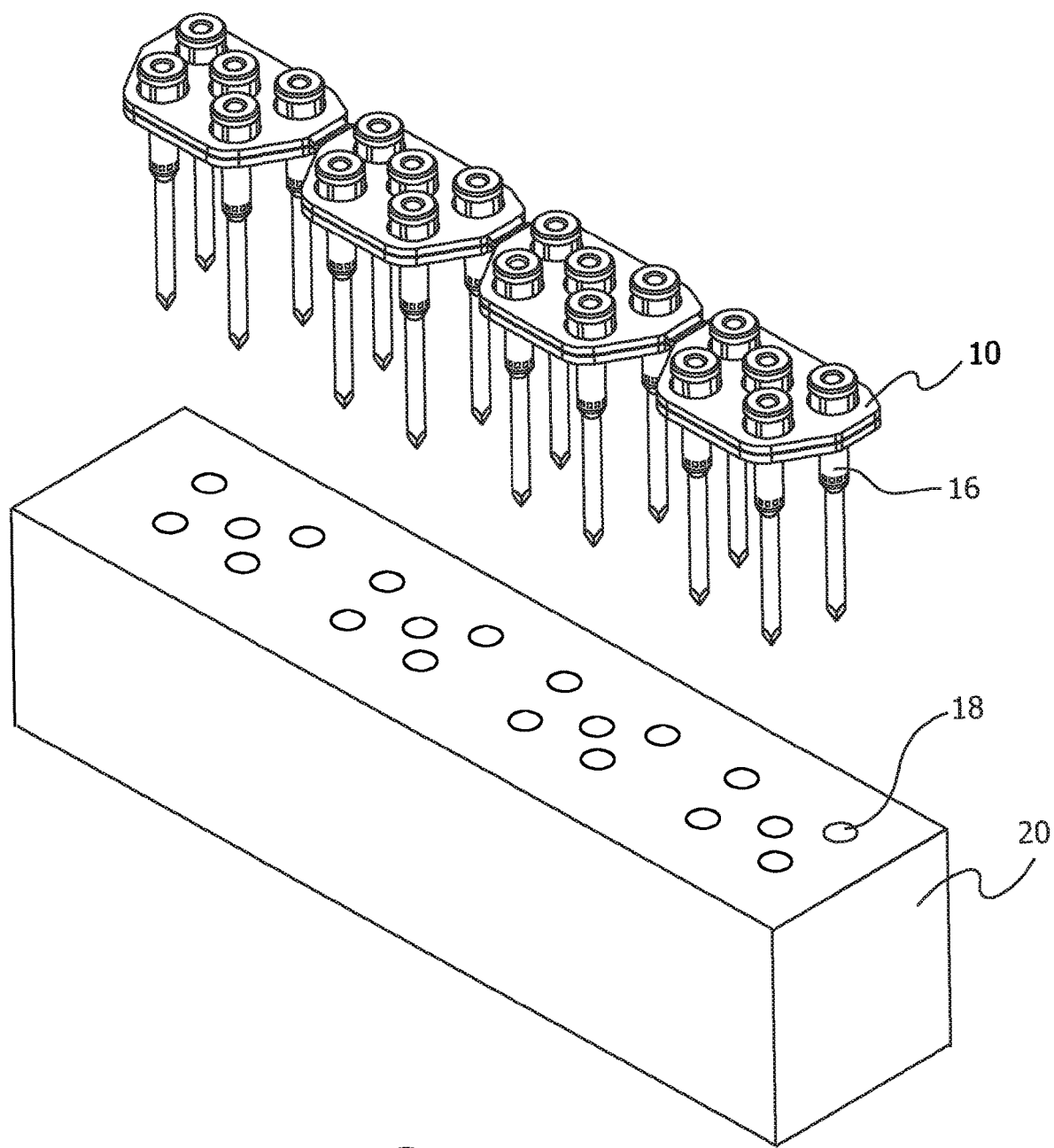
FIG. 1A is a perspective view of the strip of rivet holders of FIG. 1 positioned above a guide block.
Figure 2:
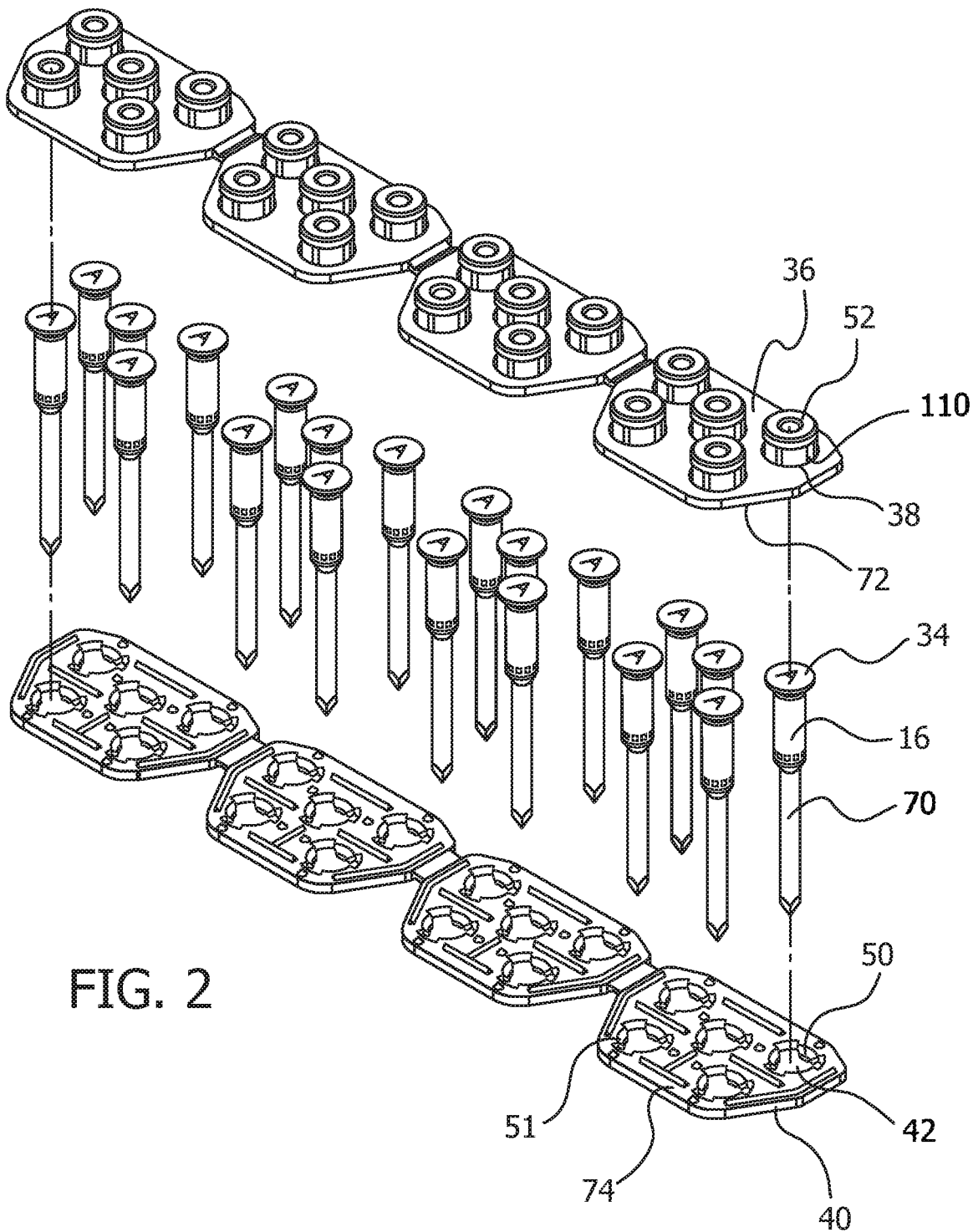
FIG. 2 is a perspective, exploded view of the strip of rivet holders of FIG. 1 showing each rivet holder having a top plate member and a bottom plate member that are secured together to capture heads of the rivets therebetween.

With reference to FIGS. 1 and 2, a rivet collating system 10 is disclosed including rivet holders 14 that each hold one or more rivets 16 in a predetermined pattern which corresponds to a pattern of guide bores 18 (see FIG. 11) of a guide block 20. As is known, the guide block 20 is operable to guide the rivets 16 for being driven through apertures of an upper plate of a rivet belt fastener with the upper plate apertures aligned with the guide block bores 18 and with apertures of a lower plate of the rivet belt fastener. The rivets 16 are then driven through the underlying conveyor belt and through the lower plate apertures.

The holders 14 have plate bodies 30 connected in a strip 12 by frangible bridges, such as webs 80. The plate bodies 30 each have a top plate member 36 and a bottom plate member 40 that are secured together to capture enlarged heads 34 of the rivets 16 therebetween. The holder body 30 has cavities 32 (see FIG. 1) that receive the rivet heads 34, the cavities 32 including vertically aligned apertures 38, 42 of the top and bottom plate members 36, 40. As shown in FIG. 2, each holder 14 has drive heads 52 associated with the holder body cavities 32 and frangible portions 110 connecting the drive heads 52 to the plate body 30 to allow the drive heads 52 to be driven relative to the plate body 30, such as by being hit with a hammer or mallet, to push the rivet heads 34 out from the cavities 32. The bottom plate member 40 includes retaining webs 50 for supporting the rivet heads 34 in the cavities 32 of the holder 14. The retaining webs 50 resist unintentional removal of the rivets 16 from the holder 14 during transit and storage while permitting a user to quickly and easily drive the rivets 16 out of the holder 14 using the drive heads 52.

Figure 11:
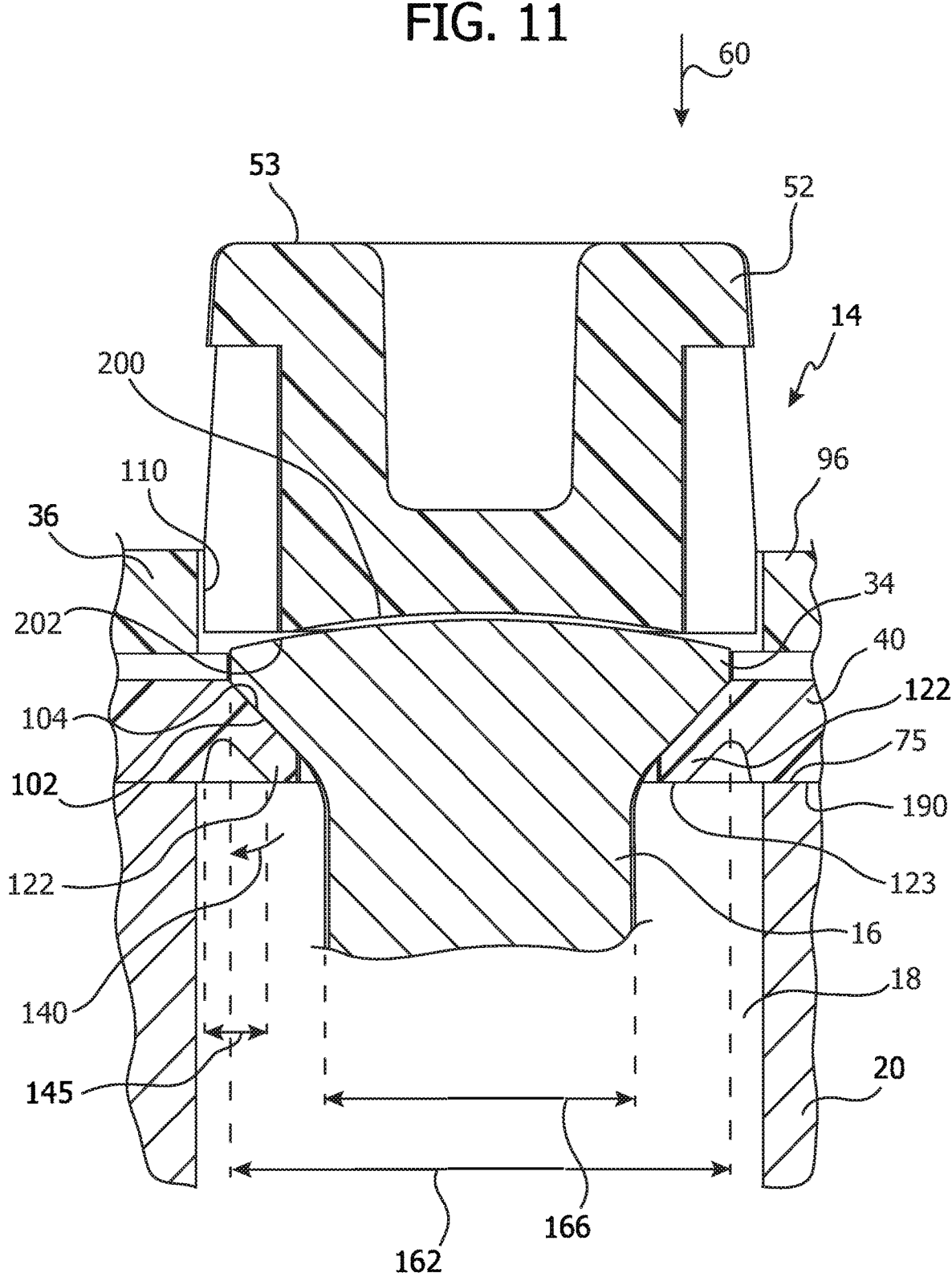
FIG. 11 is a cross-sectional view taken across line 11-11 in FIG. 6 showing the holder positioned on a guide block and a lower portion of the rivet extending into a guide bore of the guide block.
Figure 12:
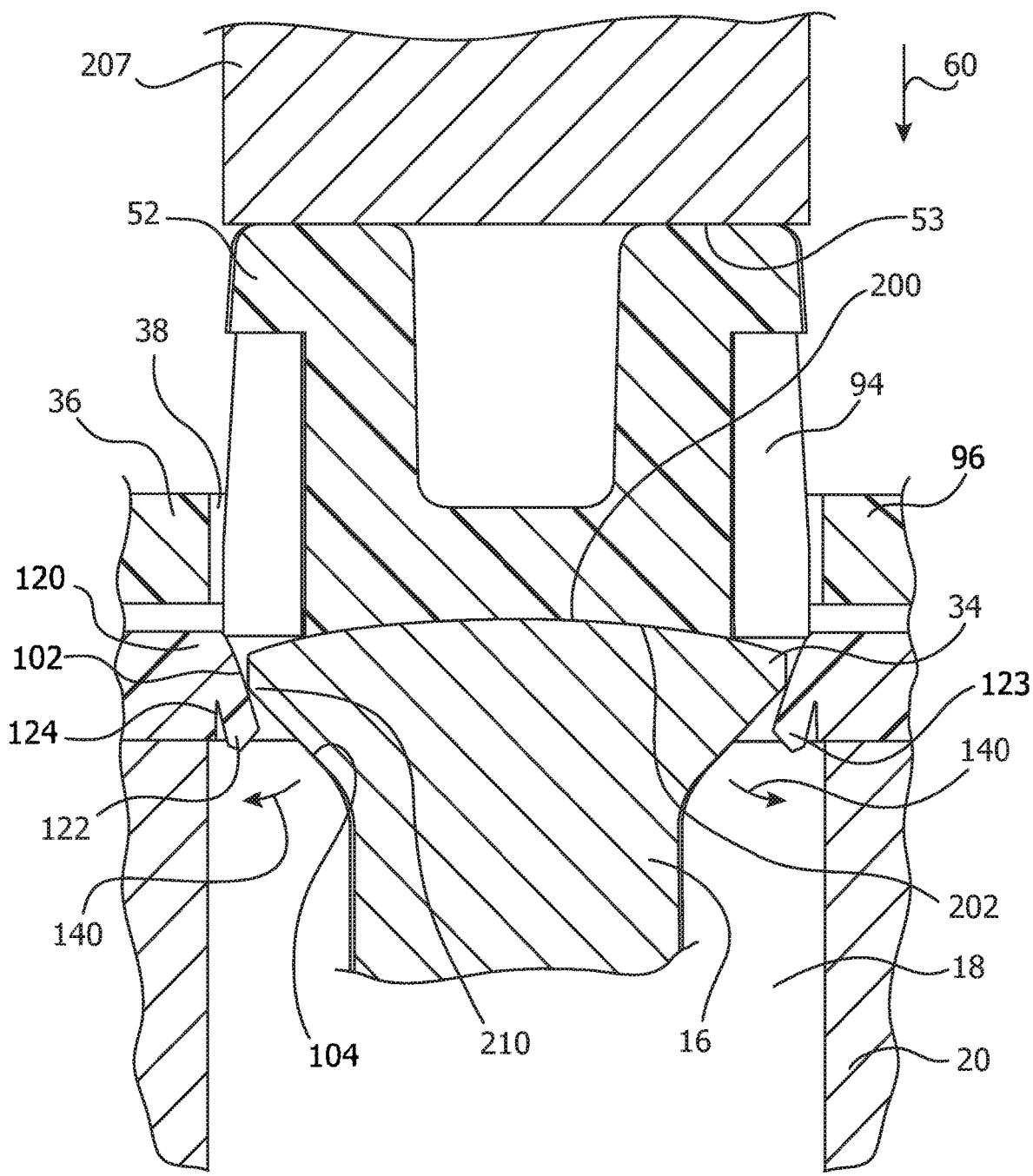
FIG. 12 is a cross-sectional view similar to FIG. 11 showing a tool striking the drive head and the retaining webs flexing to release the rivet head as the drive head drives the rivet head out of the holder.

In one form, the retaining webs 50 are made of thinned material of the bottom plate member 40 by way of a downwardly inclined surface 51 (see FIGS. 2 and 10) extending from a substantially flat upper main surface 74 of the bottom plate member 40 and an upwardly directed groove 124 extending from a substantially flat lower main surface 75 of the bottom plate member 40 so that the webs include thin, flexible retaining flap portions 122. As shown in FIGS. 11 and 12, the flap portions 122 deflect in a transverse direction to the downward path of the rivet head 34 as the rivet head 34 is driven from the holder 14 by the drive heads 52. The retaining webs 50 are flush with or recessed from the lower main surface 74 of the bottom plate member 40 such that the retaining webs 50 do not extend beyond a thickness 130 of the bottom plate member 40 to maintain a relatively low profile for the holder 14. In this manner, the inclined surfaces 51 and grooves 124 provide flexibility for the flap portions 122 by defining hinge portions 120 having reduced thicknesses 134 (see FIG. 10) that flex in response to driving of the rivet heads 34 from the holder 14. Further, as mentioned the retaining webs 50 generally do not extend below the lower main surface 74 with the retaining webs 50 in their initial, rivet-holding configuration which makes the strip 12 of holders 14 easier to seat on the guide block 20, as discussed in greater detail below.

With reference to FIG. 2, the strip 12 is assembled by advancing lower portions of the rivets 16 through the apertures 42 of the bottom plate members 40 to seat the rivet heads 34 against the retaining webs 50 thereof. Next, substantially flat lower main surfaces 72 of the top plate members 36 are positioned on substantially flat upper main surfaces 74 of the bottom plate members 40. Each top plate member 36 and its associated bottom plate member 40 of the holders 14 are then secured together, such as by ultrasonic welding. With the top and bottom plate members 36, 40 of each holder 14 secured together, the drive heads 52 and the retaining webs 50 capture the rivet heads 34 therebetween. As an alternative to ultrasonic welding, the top plate members 36 and the bottom plate members 40 may be secured together using adhesive, fasteners, heat staking, molded mechanical locks, or other approaches.

Figure 7:
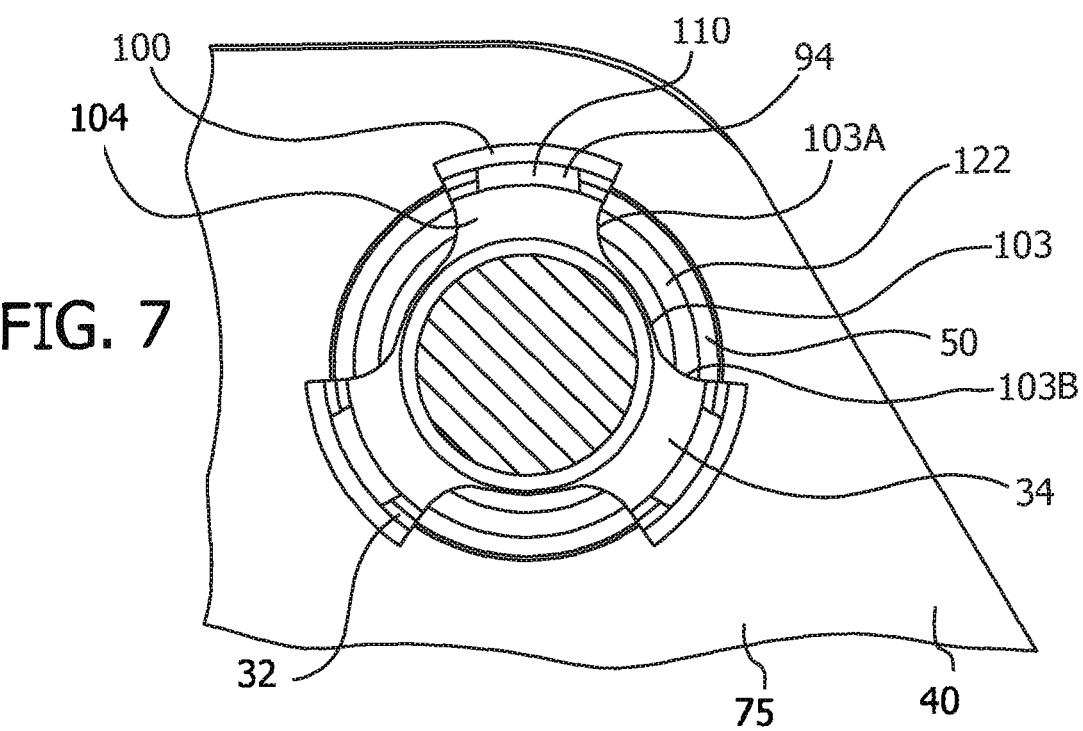
FIG. 7 is a bottom plan view, partially in section, taken along line 7-7 of FIG. 5 showing the rivet head received in an aperture of the bottom plate member and retaining webs of the bottom plate member circumferentially spaced about the aperture.
Figure 8:
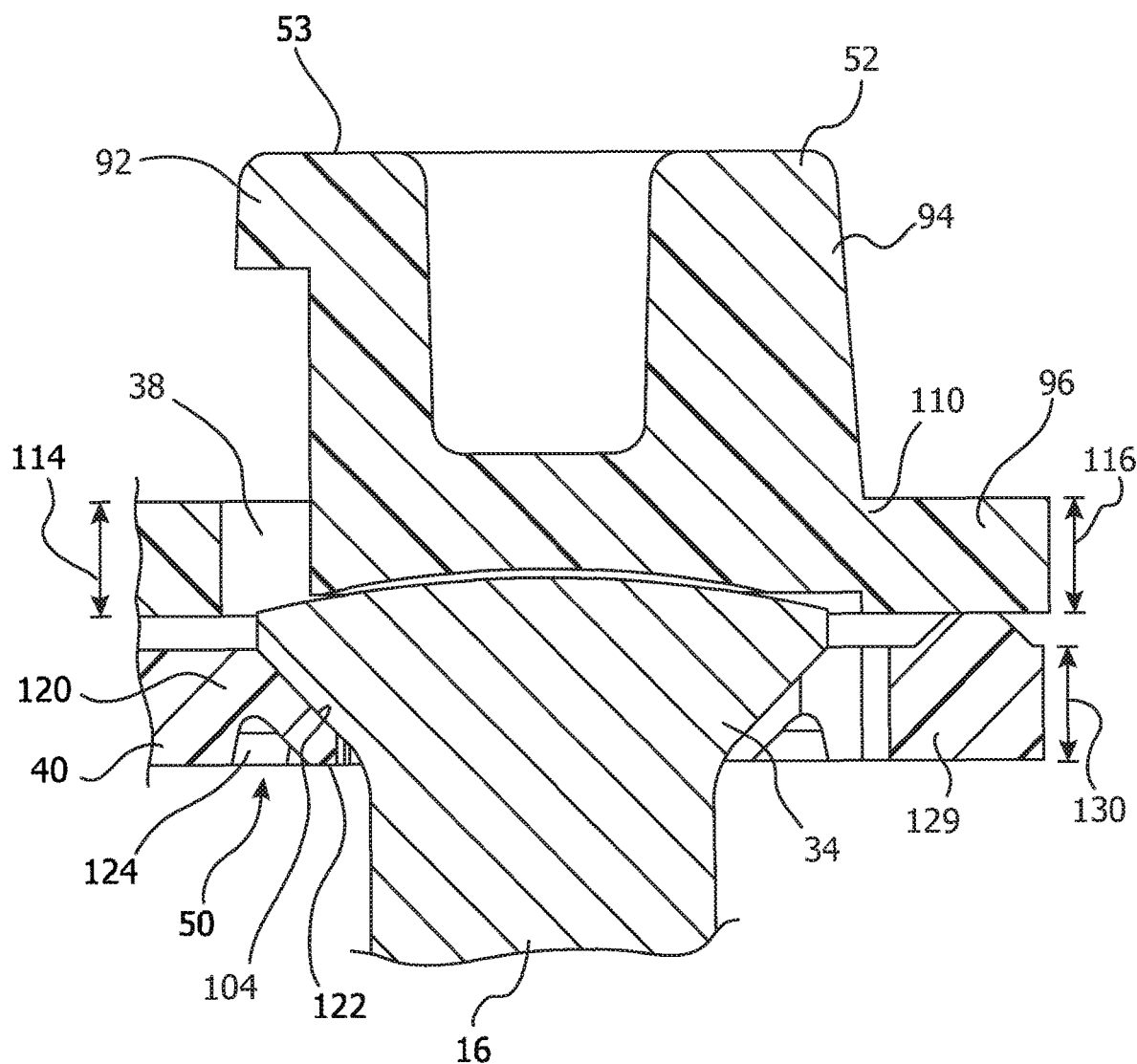
FIG. 8 is a cross-sectional view taken across line 8-8 of FIG. 6 showing the rivet head captured between the drive head and the retaining webs.
Figure 9:
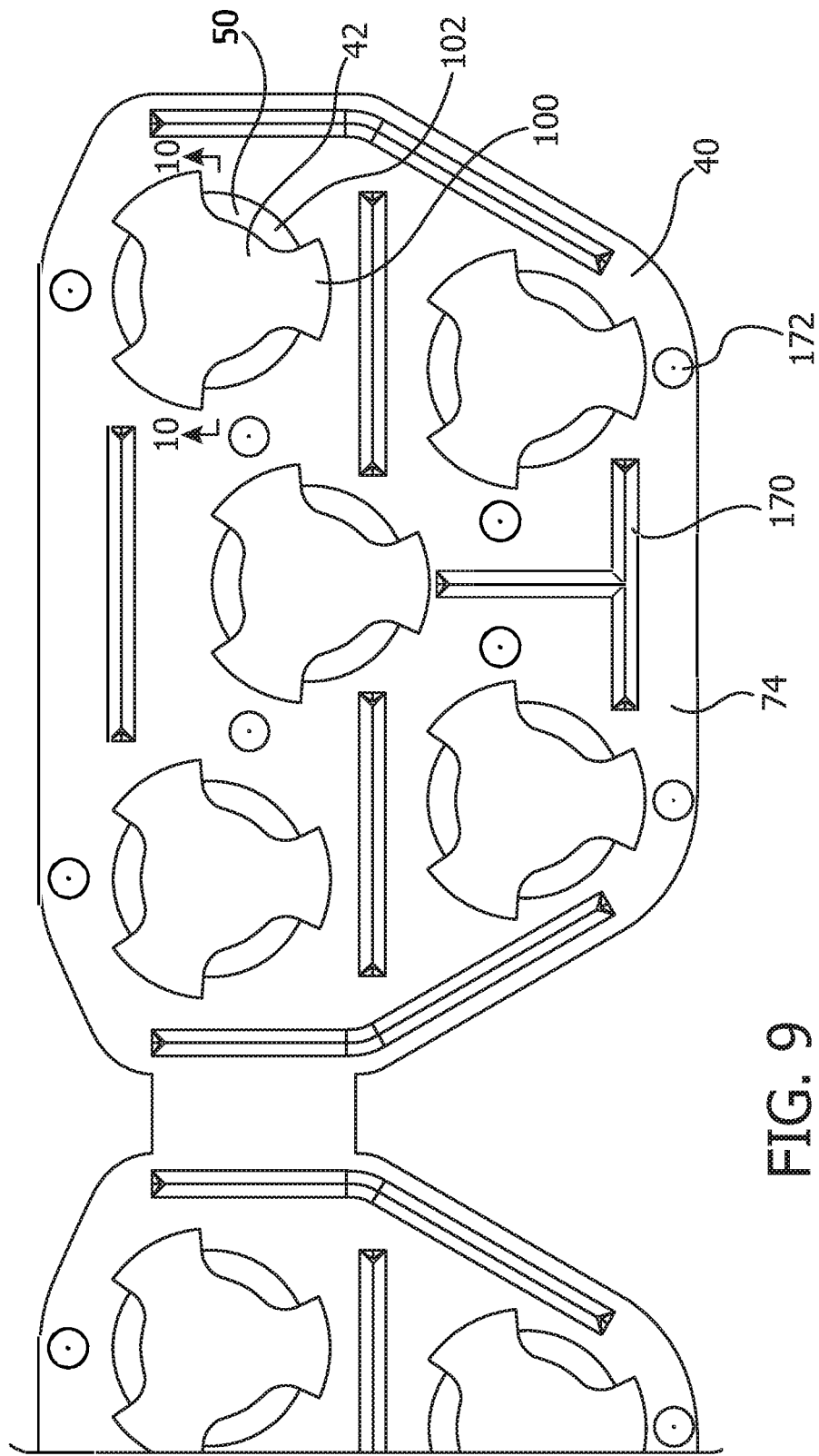
FIG. 9 is a top plan view of the bottom plate member of FIG. 7 showing radially enlarged openings of the bottom plate member separating the retaining webs about the apertures.

Preferably, the retaining webs 50 include a circumferential spacing between at least portions thereof to provide them with flexibility for driving of the rivets 16 out from the holder 14. With reference to FIGS. 7-9, in one form the retaining webs 50 of the bottom plate member 40 are circumferentially spaced about the aperture 42 by radially enlarged openings 100 that reduce the circumferential width of the webs 50 and increase the flexibility of the webs 50. The openings 100 provide a radial enlargement of the aperture 34 and extend through the bottom plate member 40. The flap portion 122 of each retaining web 50 has a substantially arcuate shape extending about the aperture 42 and includes a perimeter edge 103 that forms the outer shape of the flap portion 122. The openings 100 extend in an arcuate fashion between side portions 103A, 103B of the edge 103 of the webs 50 and extend radially outward sufficiently far so that the openings 100 may receive ribs 94 of an associated drive head 52, as discussed in greater detail below. By controlling the size and shape of the surfaces 51, the grooves 124, and the openings 100 of the bottom plate member 40, the flexibility of the retaining webs 50 can be precisely controlled while providing sufficient resistance to unintentional removal of the rivets 16 from the holder 14.

Figure 10:
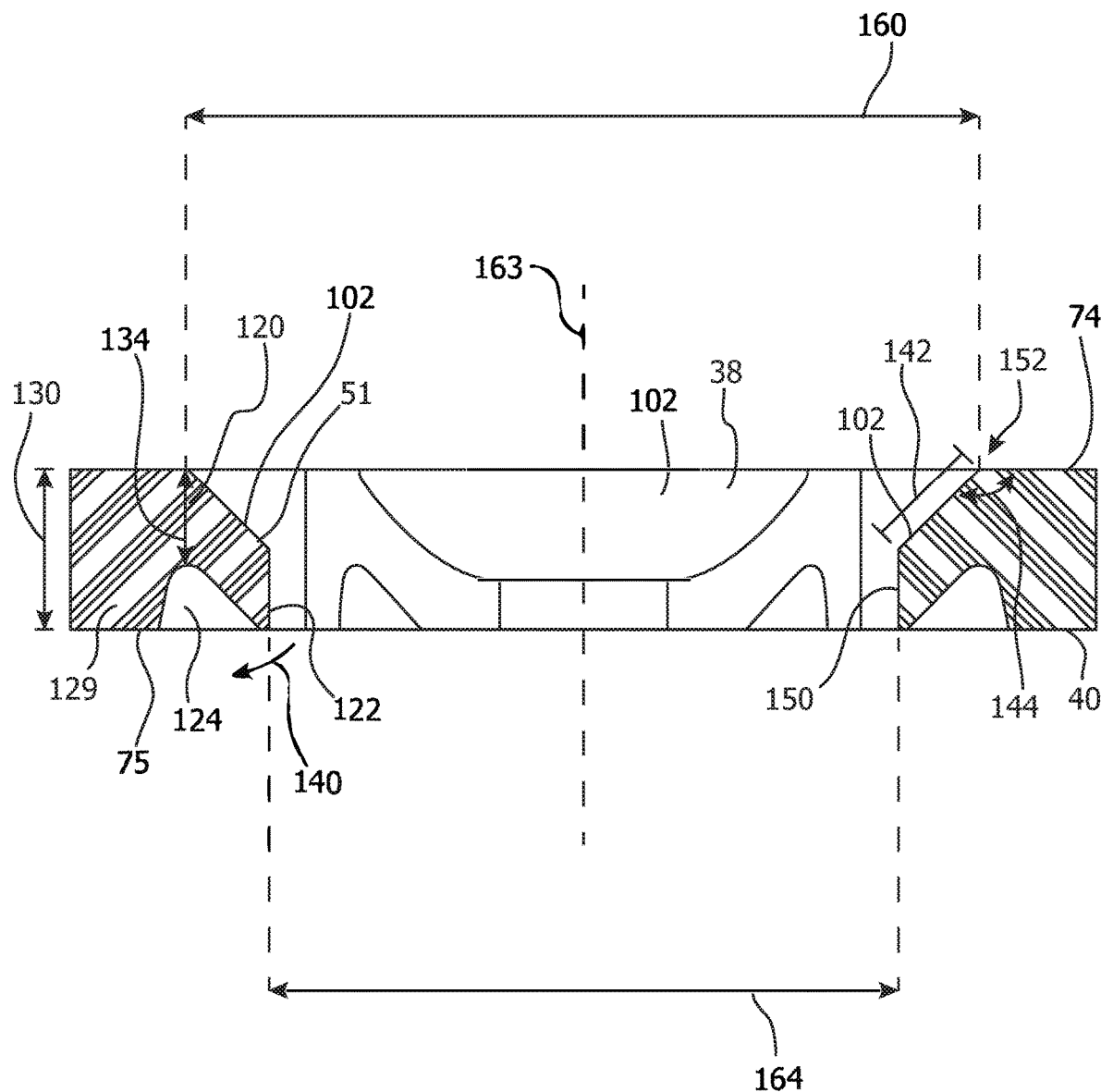
FIG. 10 is a cross-sectional view taken across line 10-10 of FIG. 9 showing retaining webs of the bottom plate member that are thinned by a downwardly inclined surface extending from an upper surface of the bottom plate member and an upwardly directed groove extending from a lower surface of the bottom plate member.

Turning to FIG. 10, the inclined surfaces 51, flap portions 122, and grooves 124 may be disposed entirely within the thickness 130 of the bottom plate member 40 between the surfaces 74, 75 thereof. The reduced thickness hinge portions 120 connect the flap portions 122 to adjacent full thickness portions 129 of the bottom plate member 40. The groove 124 defines the reduced thickness 134 of the hinge portion 120 relative to the thickness 130 of the bottom plate member 40. The reduced thickness 134 increases the flexibility of the hinge portion 120 and permits the flap portion 122 to deflect out of the path of the rivet head 34. In addition to increasing the flexibility of the hinge portion 120, the groove 124 provides a take-up space that provides clearance for the flap portion 122 to pivot in direction 140 out of the path of the rivet head 34. The holder 14 thereby utilizes the material of the bottom plate member 40 to provide flexibility and clearance for the flap portions 122 and permit driving of the rivet head 34.

With reference to FIGS. 10 and 11, the aperture 38 of the bottom plate member 40 has a maximum upper diameter 160 at the upper main surface 74 sized to receive a head diameter 162 of the rivet head 34 and the flap portions 122 have distal ends 123 that define a lower aperture diameter 164 slightly larger than a shank diameter 166 of the rivet 16. The cavity 32 has a central vertical axis 163 and the flap portions 122 extend obliquely to the central vertical axis 163. As the rivet head 34 is driven from the holder 14 by the drive head 52, each flap portion 122 generally deflects about the associated hinge portion 120 which increases the lower opening diameter 164, decreases the size of the space in the groove 124, and permits the rivet head 34 to travel past the flap portion 122, as discussed in greater detail below with reference to FIGS. 11-13.

With reference to FIG. 10, the inclined surfaces 51 include lands 102 of the flap portions 122 with partially conical shapes configured to support a conical lower surface 104 of the rivet head 34. The bottom plate member 40 has a junction 152 between the land 102 of each flap portion 122 and the upper main surface 74 of the bottom plate member 40. The flap portion 122 has a collar surface 150 generally facing a shank of the rivet 34, and the land 102 extends from the junction 152 to the collar surface 150 and creates a width 142 of the land 102. Because the land 102 extends radially inward from the junction 152 all the way to the collar surface 150, an outer portion 210 (see FIG. 12) of the rivet head 34 cams against the land 102 near the hinge portion 120 and begins to deflect the flap portion 122 concurrently with the drive head 52 beginning to drive the rivet head 34 in direction 60. The rivet head outer portion 210 continues to cam against the land 102 farther and farther from the hinge portion 120 as the drive head 52 drives the rivet head 34 in direction 60 which progressively deflects the flap portion 122. This progressive deflection of the flap portion 122 gradually applies loading on the hinge portion 120 and reduces the likelihood of fracture at the hinge portion 120. In other forms, the lands 102 may have different shapes including partially spherical or flat, for example.

With reference to FIGS. 10 and 11, the width 142 of the land 102 extends for all or substantially all of the surface of the retaining web 50 that faces the rivet head lower surface 104. This maximizes the surface area of the contact between the land 102 and rivet head lower surface 104, which in turn provides improved distribution of the force of the rivet head 34 against the retaining web 50 as the drive head 52 drives the rivet head 34 from the holder 14. The greater force distribution provided by the land 102 reduces the likelihood of high stress in the retaining web 50 which could cause fracture of the retaining web 50.

Yet another advantage of the land 102 extending from the junction 152 to the collar surface 150 is that the width 142 of the ribbon of contact between the lands 102 and the rivet head 34 is maximized. This large ribbon of contact permits some variation in the tolerances of the top and bottom plate members 36, 40 while keeping sufficient land 102 and rivet head 34 engagement in order to resist unintentional removal of the rivets 34 from the bottom plate member 40. In one form, the width 142 of the lands 102 is in the range of approximately 0.015 inches to approximately 0.050 inches, including approximately 0.044 inches. The lands 102 may extend at an angle 144 relative to the upper main surface 74 of the bottom plate member 40, with the angle 144 being in the range of approximately 150 degrees to approximately 120 degrees, including approximately 135 degrees.

In one approach, the top plate member 36 and the bottom plate member 40 are made of injection-molded high impact polystyrene. The top plate member 36 is molded integrally with the drive heads 52 and the frangible portions 110 connecting the drive heads 52 to the top plate member 36. The bottom plate member 40 is molded to form the downwardly inclined surfaces 51, openings 100, hinge portions 120, flap portions 122, and grooves 124 in the bottom plate member 40. Because these structures are molded into the bottom plate member 40, the geometry of the downwardly inclined surfaces 51, openings 100, flap portions 122, and grooves 124 can be provided in each bottom plate member 40 with a high level of accuracy and repeatability. In other approaches, one or more of the top plate member 36 and the bottom plate member 40 may be made using additive manufacturing or 3-D printing, vacuum forming, plastic casting, or blow molding, for example.

Figure 3:
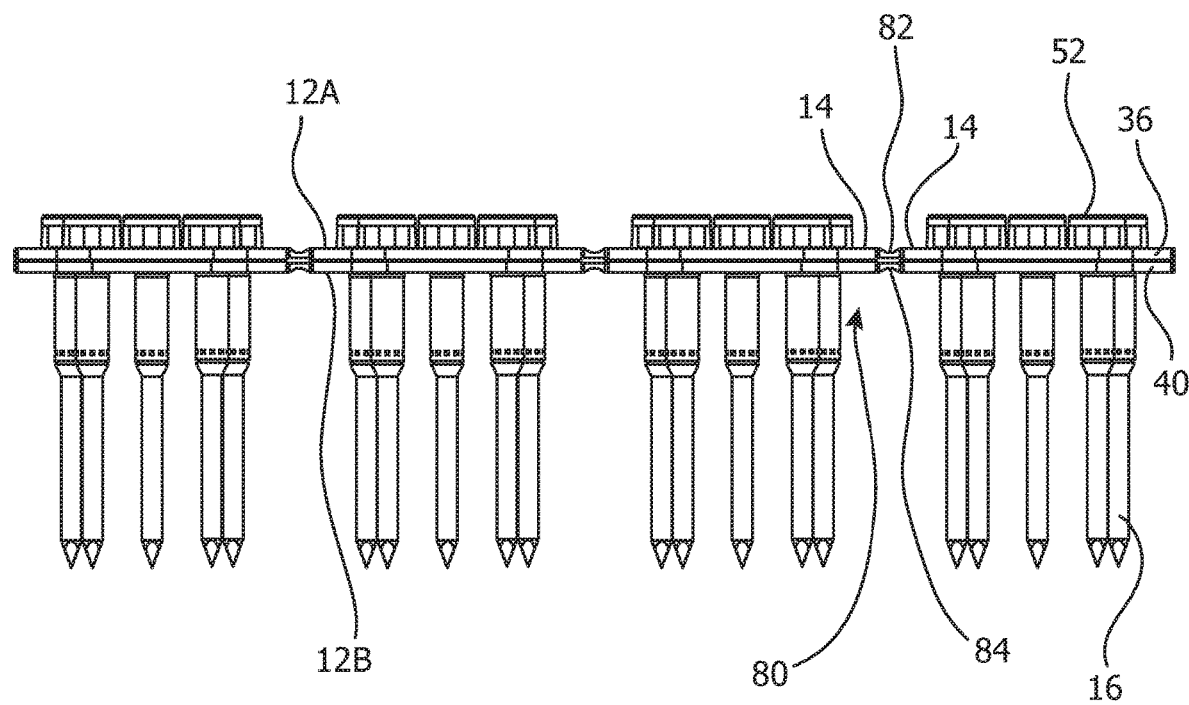
FIG. 3 is an elevational view of the rivet holder strip of FIG. 1 showing flat lower surfaces of the bottom plate members.
Figure 4:
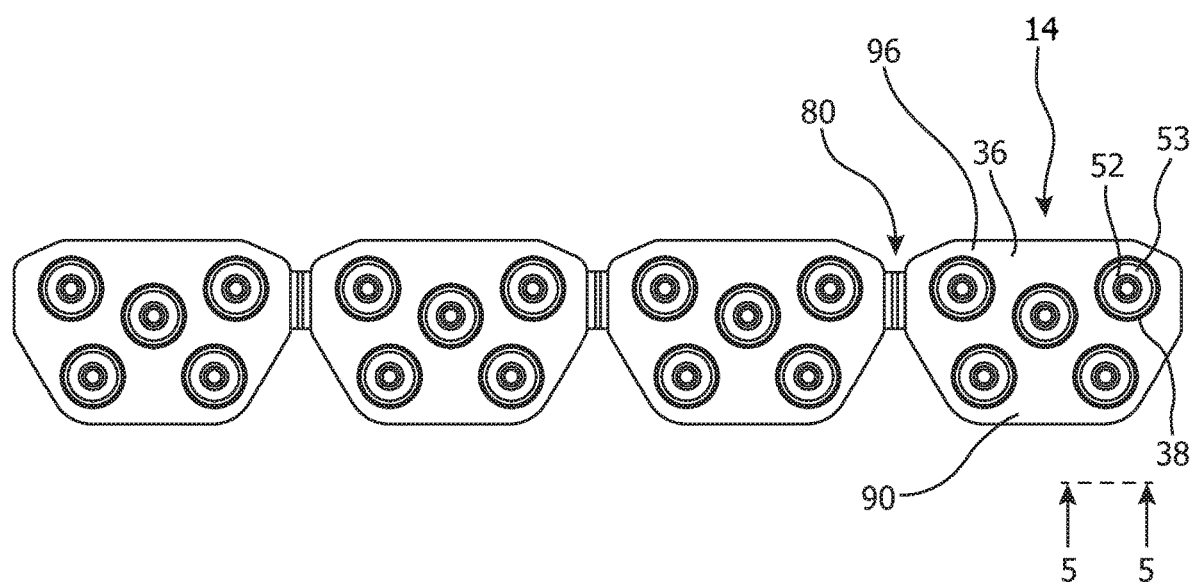
FIG. 4 is a top plan view of the strip of rivet holders of FIG. 1 showing the rivet holders connected by frangible bridges.

With reference to FIGS. 3 and 4, the strip 12 can be provided with a predetermined number of holders 14, such as four holders 14, which corresponds to the number of conveyor belt fasteners to be applied using the guide block 20. The holders 14 are connected to each other by the webs 80 including reduced thickness portions 82, 84 connecting nearby top plate members 36 and bottom plate members 40. The webs 80 permit the strip 12 to be easily broken into a smaller strip 12 as required, such as into a strip 12 containing one, two, or three holders 14.

Figure 5:
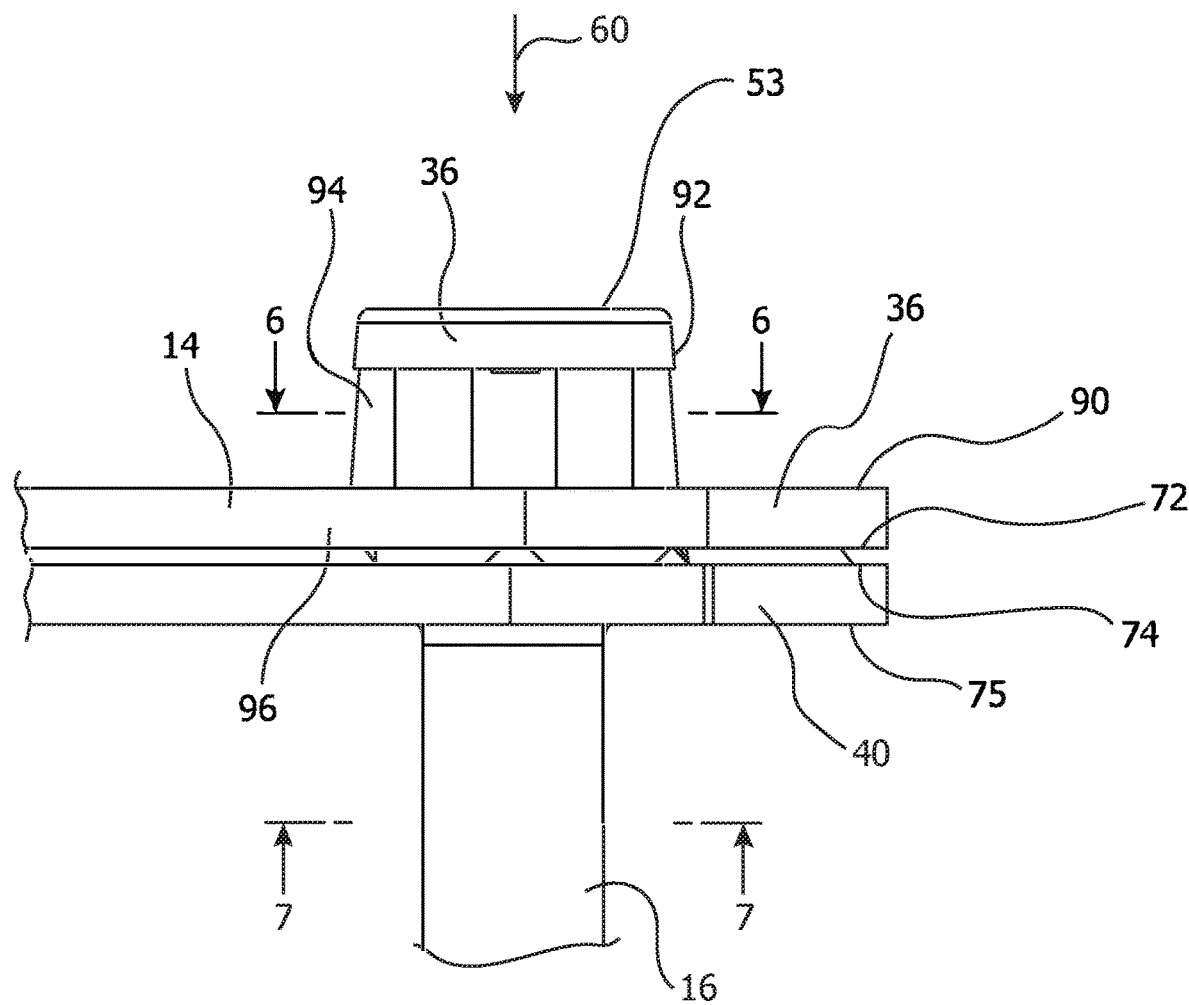
FIG. 5 is an enlarged elevational view taken along line 5-5 of FIG. 4 showing a drive head of the rivet holder for driving an associated rivet out from the rivet holder.
Figure 6:
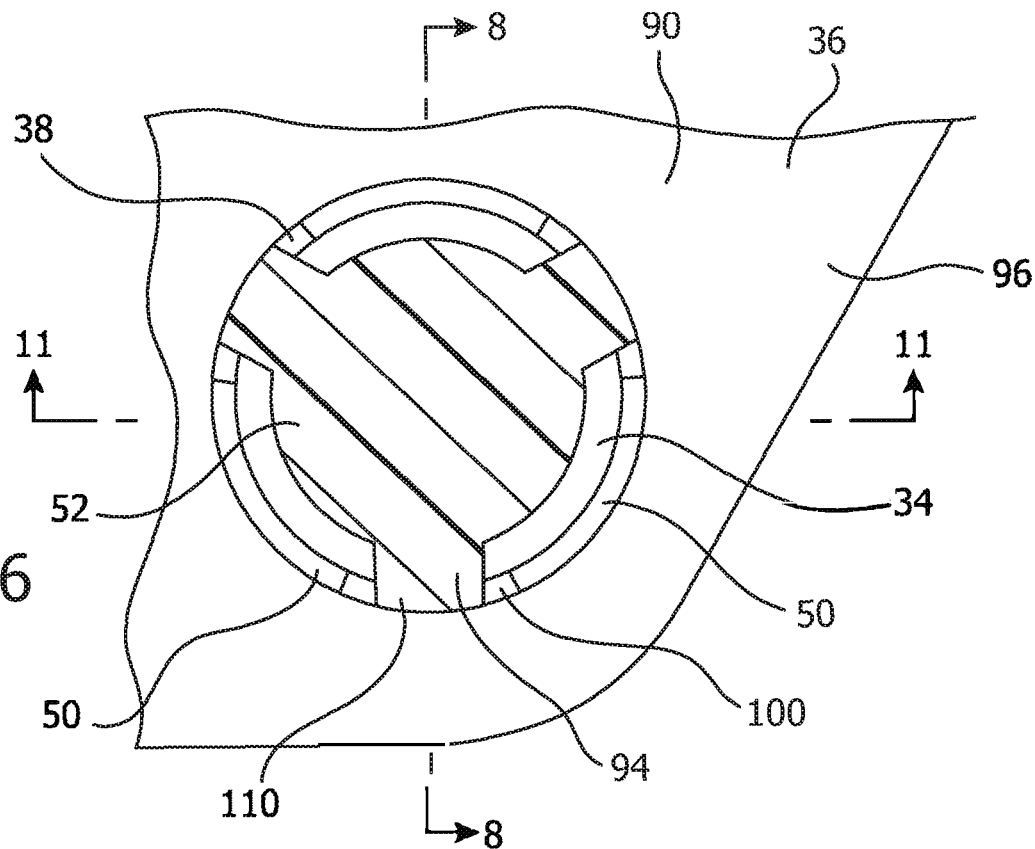
FIG. 6 is a top plan view, partially in section, taken along line 6-6 of FIG. 5 showing frangible portions integrally connecting the drive head to the top plate member.

With reference to FIGS. 1, 5, and 6, the drive heads 52 have outwardly extending ribs 94 and each top plate member 36 includes include the frangible portions 110 connecting the ribs 94 to a nearby portion 96 of the top plate member 36. The frangible portions 110 break in response to an impact or force in direction 60 against impact surfaces 53 of the drive heads 52. With reference to FIG. 8, the top plate member portion 96 may have a thickness 114 around the aperture 38 and each frangible portion 110 may have a thickness 116 that is less than the thickness 114 of the top plate member portion 96. Additionally, the frangible portions 110 extend for a much shorter extent in the circumferential direction about the aperture 34 than do the retaining webs 50 (see FIG. 6), such as less than half the extent of the retaining webs 50. The reduced thickness of the frangible portion 110, in conjunction with the reduced circumferential extent of the ribs 94, weakens the material of the frangible portion 110 such that the frangible portion 110 can break in response to an impact of sufficient magnitude in direction 60 against the impact surface 53. The structure and operation of the drive heads 52 is similar in many respects to the drive heads of the rivet holders disclosed in U.S. Pat. No. 7,654,389 to Vogrig et al., which is hereby incorporated by reference herein in its entirety.

As shown in FIGS. 4 and 5, the drive heads 52 are sized to travel through the aperture 38 of the top plate member 36 but not completely through the aperture 42 of the bottom plate member 40 after a tool 207 (see FIG. 13), such as a hammer or mallet, has been used to drive the rivet head 34 from the holder 14. More specifically, the drive heads 52 extend upward from an upper main surface 90 of the top plate member 36 and include an upper portion, such as a flange 92, sized to be in interference with the bottom plate member aperture 42 to retain the downwardly driven drive head 52 in the associated cavity 32 of the holder body 30. The flange 92 resists shifting of the drive head 52 in direction 60 beyond a predetermined vertical position within the holder 14, as discussed in greater detail below with respect to FIG. 13.

As shown in FIG. 6, the ribs 94 of the drive head 52 are circumferentially spaced about the drive head 52 and are each vertically aligned a respective one of the openings 100 of the bottom plate member 40. When a user strikes the drive heads 52 with the tool 207, the frangible portions 110 break, the drive heads 52 shift in direction 60, and the ribs 94 travel into and though the openings 100 as discussed in greater detail below. After driving the rivets 16 from the holder 14, the drive head ribs 94 are sized to interfere with the top plate member portion 96 and resist shifting of the drive heads 52 in direction 61 (see FIG. 13) beyond a predetermined vertical position within the holder 14, such as if the holder 14 is turned upside down. Thus, the flange 92 and the ribs 94 of the drive heads 52 restrict the drive heads 52 from shifting in directions 60, 61 beyond predetermined vertical positions in the holder 14 so that the drive heads 52 remain connected to the top and bottom plate members 36, 40 even after the rivets 16 have been driven from the holder 14. The flap portions 122 and the drive heads 52 are therefore configured to remain connected to the top and bottom plate members 36, 40 after driving the rivets 16 from the holder 14 and to minimize the debris produced from loading the rivets 16 into the guide block guide bores 18.

With reference to FIG. 9, the rivet holder body 30 includes features to improve the connection between the top plate member 36 and the bottom plate member 40. These features may include energy concentrating structures such as linear projections 170 and conical projections 172 of the bottom plate member 40 that extend out of the page as viewed in FIG. 9. The linear and conical projections 170, 172 fuse into the lower main surface 72 of the top plate member 36 during ultrasonic welding of the top and bottom plate members 36, 40.

As shown in FIG. 9, the linear and conical projections 170, 172 are arranged around the apertures 42 on the bottom plate member 40 such that there are several projections 170, 172 spaced semi-evenly around the apertures 42. The linear and conical projections 170, 172 provide multiple weld locations, such as at least five, around the circumference of each of the apertures 42 to provide a ring-like arrangement of joined material of the plates 36, 40 around all of the apertures 42. This reduces wobble of the rivet head 34 within the holder 14 by reducing the size of openings between the plates 36, 40 around the apertures 42. By reducing wobble of the rivets 16 within the holder 14, the holder 14 is better able to maintain the rivets 16 extending parallel to each other which makes lower portions of the rivets 16 easier to insert into the guide block guide bores 18.

With reference to FIG. 11, the drive head 52 has a lower surface 200 spaced from or in contact with the rivet head upper surface 202. The drive head lower surface 200 is configured to match that of the rivet head upper surface 202 such that the lower surface 200 can engage the upper surface 202 and drive the rivet head 34 out of the holder 14 as the drive head 52 is driven relative to the top plate member 36. In the illustrated form, the drive head lower surface 200 has a slight concave configuration while the rivet head upper surface 202 has a slight convex configuration. In other forms, the surfaces 200, 202 may have convex and concave (respectively) surfaces, flat surfaces, or other geometries.

The rivets 16 may be rivet assemblies with rivets 16 and pilot nails 70 that guide the rivets 16 through a conveyor belt. The pilot nails 70 are removed from the rivets 16 after the rivets 16 have been driven through the apertures of a fastener and a conveyor belt carcass held by the fastener. Although the term rivet or rivet assembly is used herein, it will be appreciated that other attachment members could be used with the disclosures of the subject application including nails and staples.

With reference to FIGS. 11-13, a method for driving a rivet 16 out of the holder 14 is shown. Initially, the drive head 52 and flap portions 122 are in an initial, undeformed configuration with the rivet head 34 held therebetween including the lands 102 supporting the conical lower surface 104 of the rivet head 34. A lower portion of the rivet 16 is inserted into the guide block guide bore 18 and the holder 14 is seated on the guide block 20 such that the lower main surface 74 of the bottom plate member 40 is flush with an upper surface 190 of the guide block 20. Because the flap portions 122 are flush with or recessed relative to the lower main surface 74 of the bottom plate member 40, the bottom plate member 40 can be easily shifted along the guide block upper surface 190 without interference from the flap portions 122 to seat the bottom plate member 40 on the guide block upper surface 190 and align the cavities 32 of the holder 14 with the guide block guide bores 18.

With the holder 14 seated on the guide block 20 and the rivet 16 extending in the guide block guide bore 18, a user strikes the drive head impact surface 53 with the tool 207, as shown in FIG. 12. This impact fractures the frangible portions 110 connecting the drive head 52 to the top plate member 36 and shifts the drive head 52 in direction 60 through the aperture 38 of the top plate member 36. The movement of the drive head 52 in direction 60 tightly engages the drive head lower surface 200 against the rivet head upper surface 202 and shifts the rivet head 34 in direction 60 into the guide bore 18. The rivet head outer portion 210 cams against the lands 102 of the flap portions 122 and pivots the flap portions 122 about the hinge portions 120 in direction 140 toward a deflected or pass-through configuration. As the flap portions 122 pivot apart from each other, the flap portions 122 move into and decrease widths 145 of the grooves 124. Each groove 124 thereby provides clearance for the associated flap portion 122 to deflect into the groove 124 as the flap portion 122 moves out of the way of the rivet head 34. Additionally, the movement of the drive heads 52 in direction 60 from the tool impact causes the drive head ribs 94 to enter the openings 100 of the bottom plate member 40 between the flap portions 122 (see FIGS. 9 and 12). As another example, the tool 207 may be a power press tool for applying force to the drive heads 52 rather than an impact tool such as a hammer or mallet. The power press tool 207 is configured to generate sufficient downward force on the drive heads 52 to sever the frangible portions 110.

The impact of the tool 207 against the drive head 54 drives the rivet head 34 beyond the flap portions 122 and into the guide bore 18 of the guide block 20, as shown in FIG. 13. Because each flap portion 122 is separated from the other flap portions 122 by openings 122 and has its own groove 124 and hinge portion 120, the amount and rate of deflection of each flap portion 122 caused by the rivet head 34 is independent of the other flap portions 122. This further reduces the likelihood of breakage of the flap portions 122 because each flap portion 122 deflects in direction 140 only as far as needed to permit the rivet head 34 to pass beyond the flap portion 122. This is particularly advantageous to accommodate variation in manufacturing of the holder 14 as well as shifting of the rivets 14 during transport or storage, such as if the rivet head 34 has shifted slightly off center before being driven with the tool 207.

The bottom plate member 40 may be made of high impact polystyrene and the driving of the rivet head 34 may plastically deform the hinge portions 120. Thus, once the rivet head 34 has been driven from the holder 14, the flap portions 122 may spring back in direction 141 from their deflected or pass-through configuration to an intermediate, partially deflected configuration, as shown in FIG. 13. In some approaches, one or more hinge portions 130 undergo primarily elastic deformation and the one or more flap portions 122 may return back to or closely near their initial, undeflected configuration.

The impact from the tool 207 continues to shift the drive head 52 in direction 60 after the rivet head 34 has been driven from the holder 34, as shown in FIG. 13. To restrict the drive head 52 from traveling fully into the guide bore 18, the drive head flange 92 and the bottom plate member 40 have a stop 230 therebetween that includes a stop surface 232 of the drive head flange 92 and a stop surface 234 of the bottom plate member 40. The surfaces 232, 234 abut and restrict the drive head 52 from traveling in direction 60 completely through the aperture 42 of the bottom plate member 40.

In one approach, seating the holder 14 on the guide block 20 positions the grooves 124 of each cavity 32 of the holder 14 in communication with an associated guide block guide bore 18. The distal ends 123 of the flap portions 122 deflect below the bottom plate member lower main surface 74 and into the guide bore 18 as the rivet head 34 is driven out of the holder 14.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of positioning rivets in bores of a guide block, the method comprising:
    positioning a lower surface of a holder on a guide block, the holder having an upper surface and a predetermined thickness between the upper surface and the lower surface;
    impacting upper portions of the holder with a tool to drive heads of rivets out from the holder and into the bores; and
    deflecting flap portions about hinge portions of the holder into grooves of the holder as the rivet heads are driven out from the holder, the hinge portions having a thickness that is reduced relative to the predetermined thickness of the holder.

2. The method of claim 1 wherein impacting the upper portions of the holder with the tool includes impacting upper portions of an upper plate of the holder; and
    deflecting flap portions of the holder into grooves of the holder includes deflecting flap portions of a lower plate portion of the holder into grooves of the lower plate portion.

3. The method of claim 1 wherein deflecting flap portions of the holder includes camming radially outer portions of the rivet heads against lands of the flap portions.

4. The method of claim 1 wherein deflecting flap portions of the holder includes pivoting the flap portions about the hinge portions of the holder above the grooves.

5. The method of claim 1 wherein impacting upper portions of the holder with the tool include impacting drive heads of the holder with the tool; and abutting enlarged portions of the drive heads against portions of the holder above the grooves to restrict the drive heads from falling out of the holder.

6. A method of positioning rivets in bores of a guide block, the method comprising:

positioning a lower portion of a holder on a guide block;

impacting upper portions of the holder with a tool to drive heads of rivets out from the holder and into the bores; and deflecting flap portions of the holder into grooves of the holder as the rivet heads are driven out from the holder, wherein positioning the lower portion of the holder on the guide block includes positioning a lower surface of the holder on the guide block while the flap portions of the holder are outside of the bores of the guide block.

7. The method of claim 1 wherein impacting upper portions of the holder with the tool includes impacting drive heads of the holder to drive the rivet heads out from the holder.

\* \* \* \* \*